United States Patent
Mukherjee

(10) Patent No.: US 12,347,163 B2
(45) Date of Patent: Jul. 1, 2025

(54) SYSTEM FOR FEATURELESS IMAGE CATEGORIZATION AND RECOGNITION USING UNSUPERVISED LEARNING

(71) Applicant: BANK OF AMERICA CORPORATION, Charlotte, NC (US)

(72) Inventor: Maharaj Mukherjee, Poughkeepsie, NY (US)

(73) Assignee: BANK OF AMERICA CORPORATION, Charlotte, NC (US)

( * ) Notice: Subject to any disclaimer, the term of this patent is extended or adjusted under 35 U.S.C. 154(b) by 410 days.

(21) Appl. No.: 17/991,553

(22) Filed: Nov. 21, 2022

(65) Prior Publication Data

US 2024/0169690 A1 May 23, 2024

(51) Int. Cl.
*G06V 10/75* (2022.01)
*G06V 10/36* (2022.01)
*G06V 10/764* (2022.01)

(52) U.S. Cl.
CPC .............. *G06V 10/75* (2022.01); *G06V 10/36* (2022.01); *G06V 10/764* (2022.01)

(58) Field of Classification Search
CPC .. G06F 18/2433; G06V 10/36; G06V 10/764; G06V 10/75
See application file for complete search history.

(56) References Cited

U.S. PATENT DOCUMENTS

| | | | |
|---|---|---|---|
| 10,726,558 B2 | 7/2020 | Ruda | |
| 10,929,708 B2* | 2/2021 | Syeda-Mahmood | G06T 7/0012 |
| 10,963,674 B2 | 3/2021 | Tan | |
| 11,037,029 B2* | 6/2021 | Jiang | G06V 10/82 |
| 11,263,753 B2 | 3/2022 | Larlus-Larrondo | |
| 11,308,353 B2 | 4/2022 | Singh | |
| 11,367,268 B2 | 6/2022 | Yang | |
| 11,748,887 B2* | 9/2023 | Jampani | G06N 3/084 |
| | | | 706/15 |
| 11,816,882 B2 | 11/2023 | Irie | |
| 11,893,086 B2 | 2/2024 | Levi | |
| 2008/0019595 A1 | 1/2008 | Eswaran | |
| 2016/0048849 A1* | 2/2016 | Shiftan | G06T 3/40 |
| | | | 705/7.29 |
| 2016/0232401 A1* | 8/2016 | Hoyos | G06V 40/1376 |

(Continued)

FOREIGN PATENT DOCUMENTS

| WO | 2019010950 A1 | 1/2019 |
|---|---|---|
| WO | 2022001489 A1 | 1/2022 |

*Primary Examiner* — Shaghayegh Azima
(74) *Attorney, Agent, or Firm* — Moore & Van Allen PLLC; Anup Iyer

(57) ABSTRACT

Systems, computer program products, and methods are described herein for image categorization and recognition using unsupervised learning. The present disclosure is configured to receive an unseen image; implement a first low pass filter on the unseen image to generate a first version of the unseen image; implement a second low pass filter on the first version of the unseen image to generate a second version of the unseen image; determine a subset of the second version of the recorded images that matches the second version of the unseen image; retrieve a subset of first version of recorded images associated with the subset of second version of recorded images; and determine a first recorded image from the subset of the first version of the recorded images that matches the first version of the unseen image.

20 Claims, 9 Drawing Sheets

(56) References Cited

U.S. PATENT DOCUMENTS

| | | |
|---|---|---|
| 2020/0151481 A1 | 5/2020 | Yoo |
| 2021/0350510 A1* | 11/2021 | Gomez Diaz ........ G02B 27/286 |
| 2022/0027732 A1 | 1/2022 | Arslan |
| 2022/0058391 A1 | 2/2022 | Kumar |
| 2022/0092464 A1 | 3/2022 | Wistuba |
| 2022/0292316 A1* | 9/2022 | Levi ..................... G06F 18/241 |
| 2023/0095041 A1 | 3/2023 | Wang |
| 2024/0144566 A1 | 5/2024 | Bagherinezhad |

* cited by examiner

SYSTEM FOR FEATURELESS IMAGE CATEGORIZATION AND RECOGNITION USING UNSUPERVISED LEARNING

TECHNOLOGICAL FIELD

Example embodiments of the present disclosure relate to image categorization and recognition.

BACKGROUND

Image categorization often involves images with distinct features and feature boundaries such as a human face, car, dog, ship, boat, flower, and/or the like. Image classification algorithms tend to focus on these features when categorizing, classifying and/or identifying these images.

Applicant has identified a number of deficiencies and problems associated with image categorization and recognition in images with amorphous features), such as fire, snow, water, grassy fields, and/or the like. Through applied effort, ingenuity, and innovation, many of these identified problems have been solved by developing solutions that are included in embodiments of the present disclosure, many examples of which are described in detail herein

BRIEF SUMMARY

Systems, methods, and computer program products are provided for image categorization and recognition using unsupervised learning.

In one aspect, a system for image categorization and recognition using unsupervised learning is presented. The system comprising: a non-transitory storage device; and a processor coupled to the non-transitory storage device, wherein the processor is configured to: receive an unseen image, wherein the unseen image is associated with a current resiliency status associated with a device; implement a first low pass filter on the unseen image to generate a first version of the unseen image; implement a second low pass filter on the first version of the unseen image to generate a second version of the unseen image; compare the second version of the unseen image with second version of recorded images; determine a subset of the second version of the recorded images that matches the second version of the unseen image; retrieve a subset of first version of recorded images associated with the subset of second version of recorded images; compare the first version of the unseen image with the subset of the first version of the recorded images; determine at least one first version of the recorded image from the subset of the first version of the recorded images that matches the first version of the unseen image; retrieve a first recorded image associated with the at least one first version of the recorded image; retrieve, from a resiliency database, a first set of responsive actions associated with the first recorded image; and implement the first set of responsive actions on the device.

In some embodiments, the processor is further configured to: receive the recorded images; implement the first low pass filter on the recorded images to generate the first version of the recorded images; generate first hash values for the first version of the recorded images; and store the first hash values in a first hash table.

In some embodiments, the processor is further configured to: implement the second low pass filter on the first version of the recorded images to generate the second version of the recorded images; generate second hash values for the second version of the recorded images; and store the second hash values in a second hash table.

In some embodiments, in comparing the first version of the unseen image with the subset of the first version of the recorded images, the processor is further configured to: generate a first hash value for the first version of the unseen image; retrieve, from the first hash table, a subset of first hash values associated with the subset of first version of recorded images; and compare the first hash value for the first version of the unseen image with the subset of the first hash values associated with the subset of first version of recorded images.

In some embodiments, in comparing the second version of the unseen image with second version of recorded images, the processor is further configured to: generate a second hash value for the second version of the unseen image; compare the second hash value for the second version of the unseen image with second hash values for second version of recorded images; and determine a subset of the second hash values that match the second hash value for the second version of the unseen image.

In some embodiments, in determining the at least one first version of the recorded image from the subset of the first version of the recorded images that matches the first version of the unseen image, the processor is further configured to: determine at least one first hash value associated with the at least one first version of the recorded image.

In some embodiments, in retrieving the first recorded image, the processor is further configured to: determine a confidence level associated with the matching of the at least one first version of the recorded image and the first version of the unseen image; determine that the confidence level associated with the matching of a first version of the first recorded image meets a selection threshold, wherein the first version of the first recorded image is associated with the at least one first version of the recorded image; and in response, determine that the current resiliency status of the device as indicated in the unseen image matches a first known resiliency status associated with the first recorded image.

In some embodiments, the processor is further configured to: receive the recorded images, wherein the recorded images are associated with known resiliency statuses associated with the device; receive, from a user input device, a set of responsive actions associated with each recorded image; and store the recorded images, the known resiliency statuses associated with the device corresponding to the recorded images, and the set of responsive actions associated with each record image in the resiliency database.

In some embodiments, in implementing a first low pass filter on the unseen image, the processor is further configured to: implement a Fourier Transform (FT) on the unseen image to generate a frequency domain representation of the unseen image; and implement the first low pass filter on the frequency domain representation of the unseen image to generate the first version of the unseen image.

In another aspect, a computer program product for image categorization and recognition using unsupervised learning, the computer program product comprising a non-transitory computer-readable medium comprising code causing an apparatus to: receive an unseen image, wherein the unseen image is associated with a current resiliency status associated with a device; implement a first low pass filter on the unseen image to generate a first version of the unseen image; implement a second low pass filter on the first version of the unseen image to generate a second version of the unseen image; compare the second version of the unseen image with second version of recorded images; determine a subset of the second version of the recorded images that matches the second version of the unseen image; retrieve a subset of first version of recorded images associated with the subset of second version of recorded images; compare the first version of the unseen image with the subset of the first version of the recorded images; determine at least one first version of the recorded image from the subset of the first version of the recorded images that matches the first version of the unseen image; retrieve a first recorded image associated with the at least one first version of the recorded image; retrieve, from a resiliency database, a first set of responsive actions associated with the first recorded image; and implement the first set of responsive actions on the device.

In yet another aspect, a method for image categorization and recognition using unsupervised learning is presented. The receiving an unseen image, wherein the unseen image is associated with a current resiliency status associated with a device; implementing a first low pass filter on the unseen image to generate a first version of the unseen image; implementing a second low pass filter on the first version of the unseen image to generate a second version of the unseen image; comparing the second version of the unseen image with second version of recorded images; determining a subset of the second version of the recorded images that matches the second version of the unseen image; retrieving a subset of first version of recorded images associated with the subset of second version of recorded images; comparing the first version of the unseen image with the subset of the first version of the recorded images; determining at least one first version of the recorded image from the subset of the first version of the recorded images that matches the first version of the unseen image; retrieving a first recorded image associated with the at least one first version of the recorded image; retrieving, from a resiliency database, a first set of responsive actions associated with the first recorded image; and implementing the first set of responsive actions on the device.

The above summary is provided merely for purposes of summarizing some example embodiments to provide a basic understanding of some aspects of the present disclosure. Accordingly, it will be appreciated that the above-described embodiments are merely examples and should not be construed to narrow the scope or spirit of the disclosure in any way. It will be appreciated that the scope of the present disclosure encompasses many potential embodiments in addition to those here summarized, some of which will be further described below.

BRIEF DESCRIPTION OF THE DRAWINGS

Having thus described embodiments of the disclosure in general terms, reference will now be made the accompanying drawings. The components illustrated in the figures may or may not be present in certain embodiments described herein. Some embodiments may include fewer (or more) components than those shown in the figures.

Figure 1A:
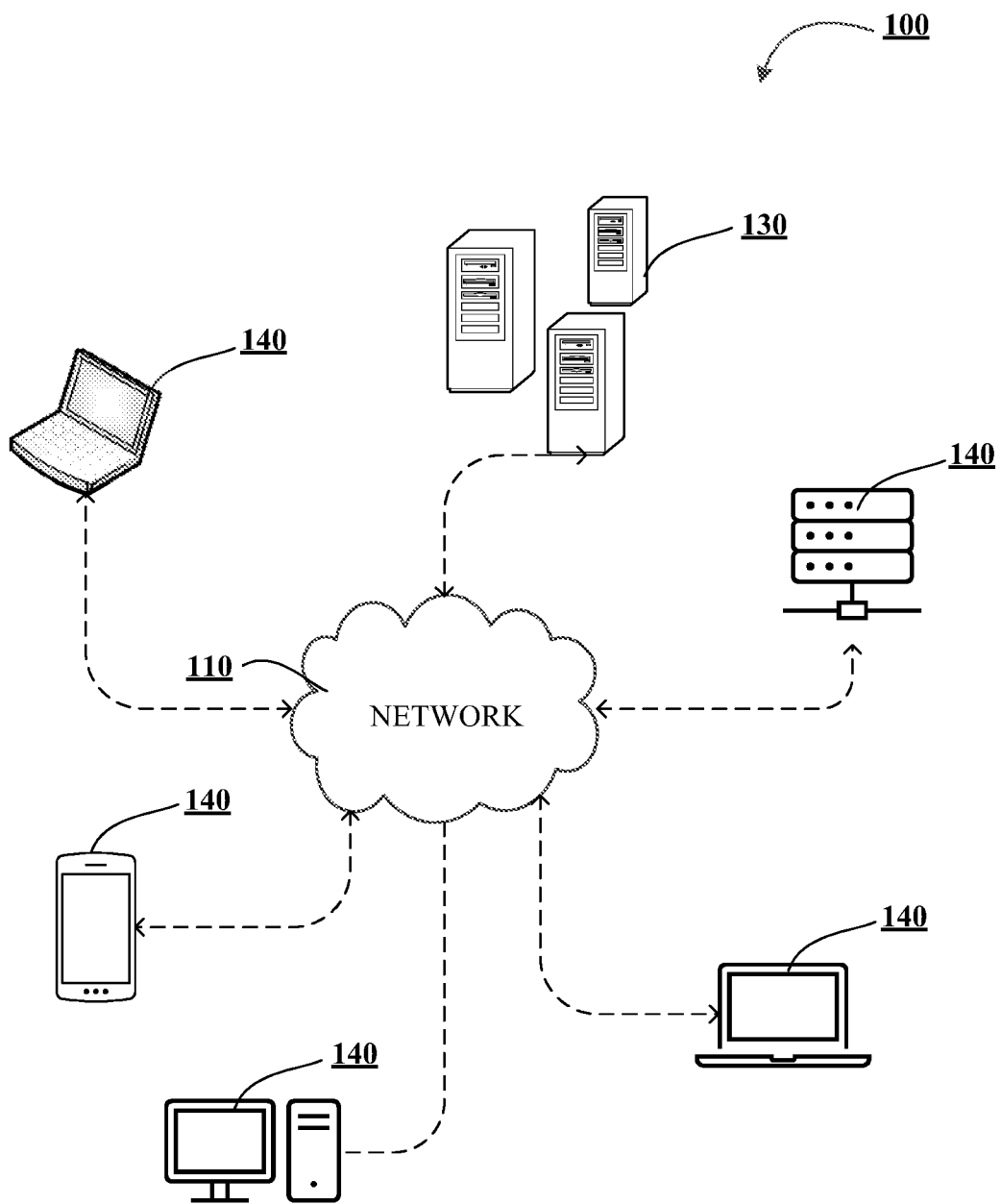
Figure 1B:
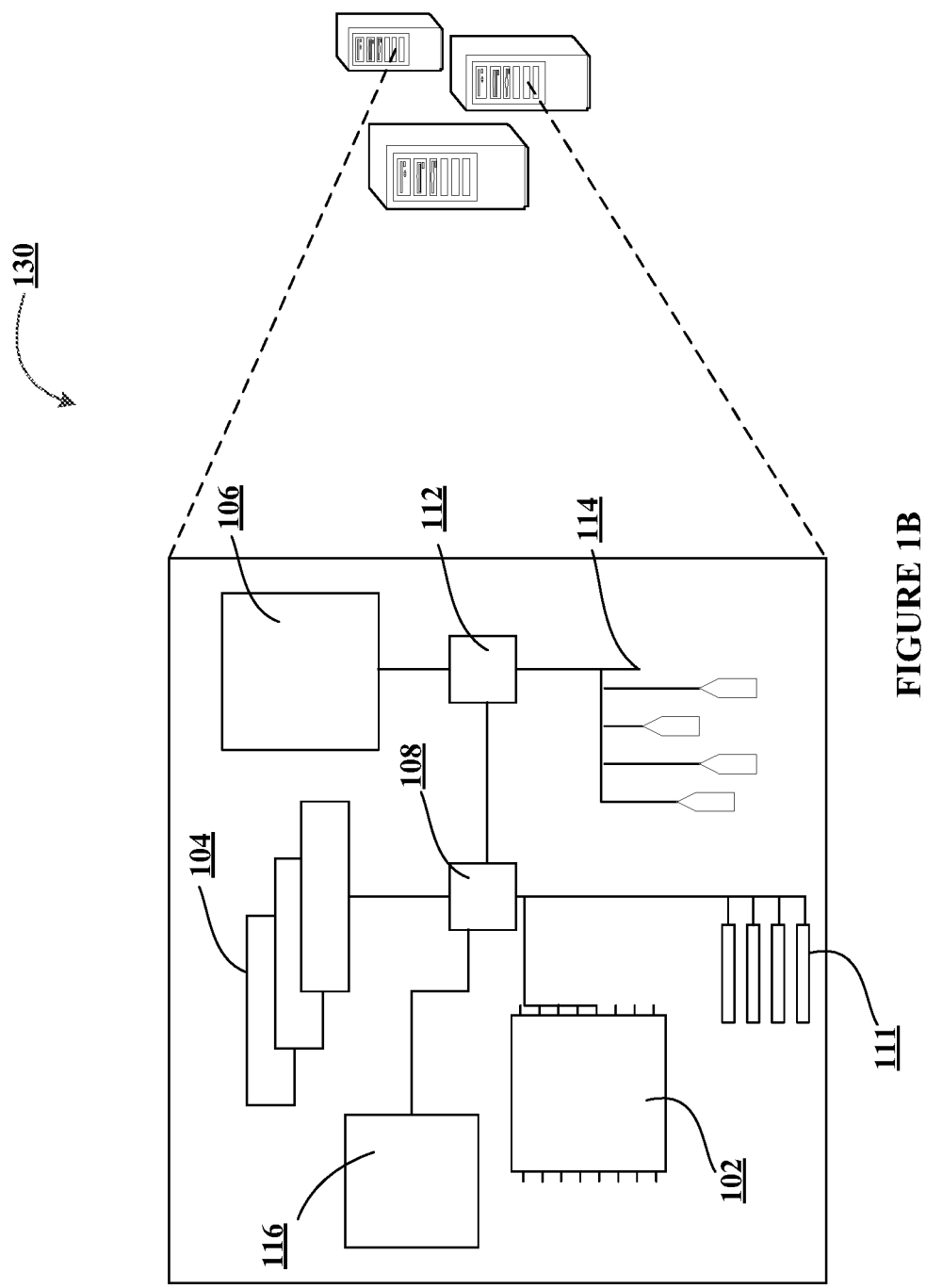
Figure 1C:
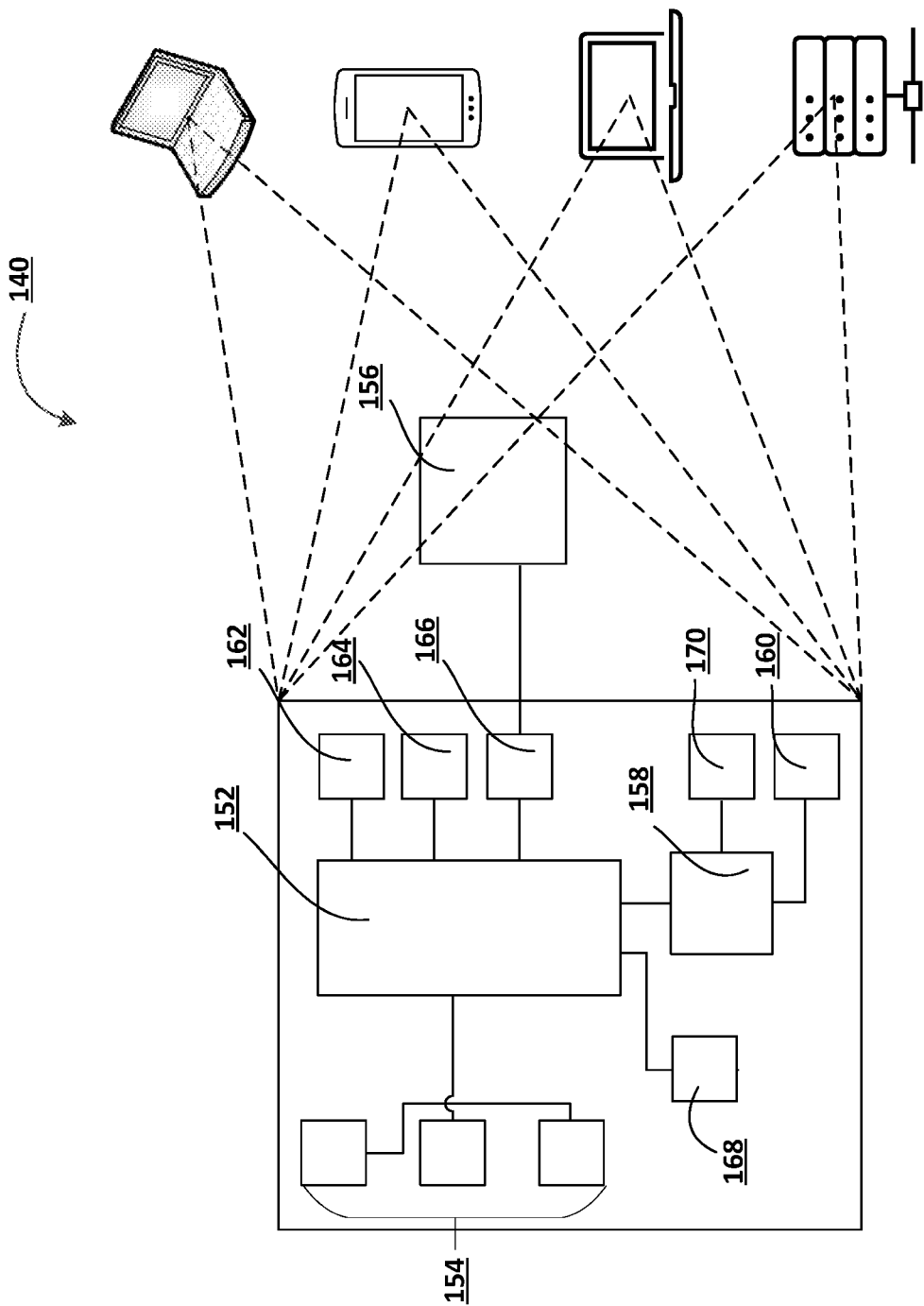
Figure 2:
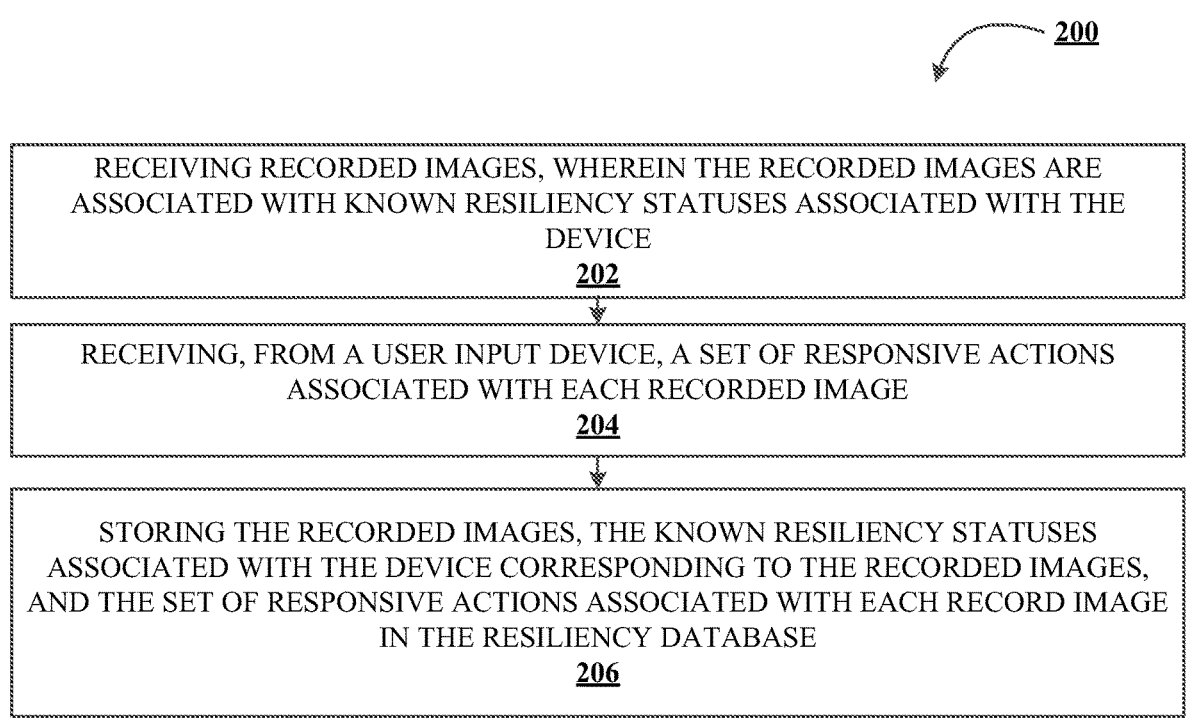
Figure 3:
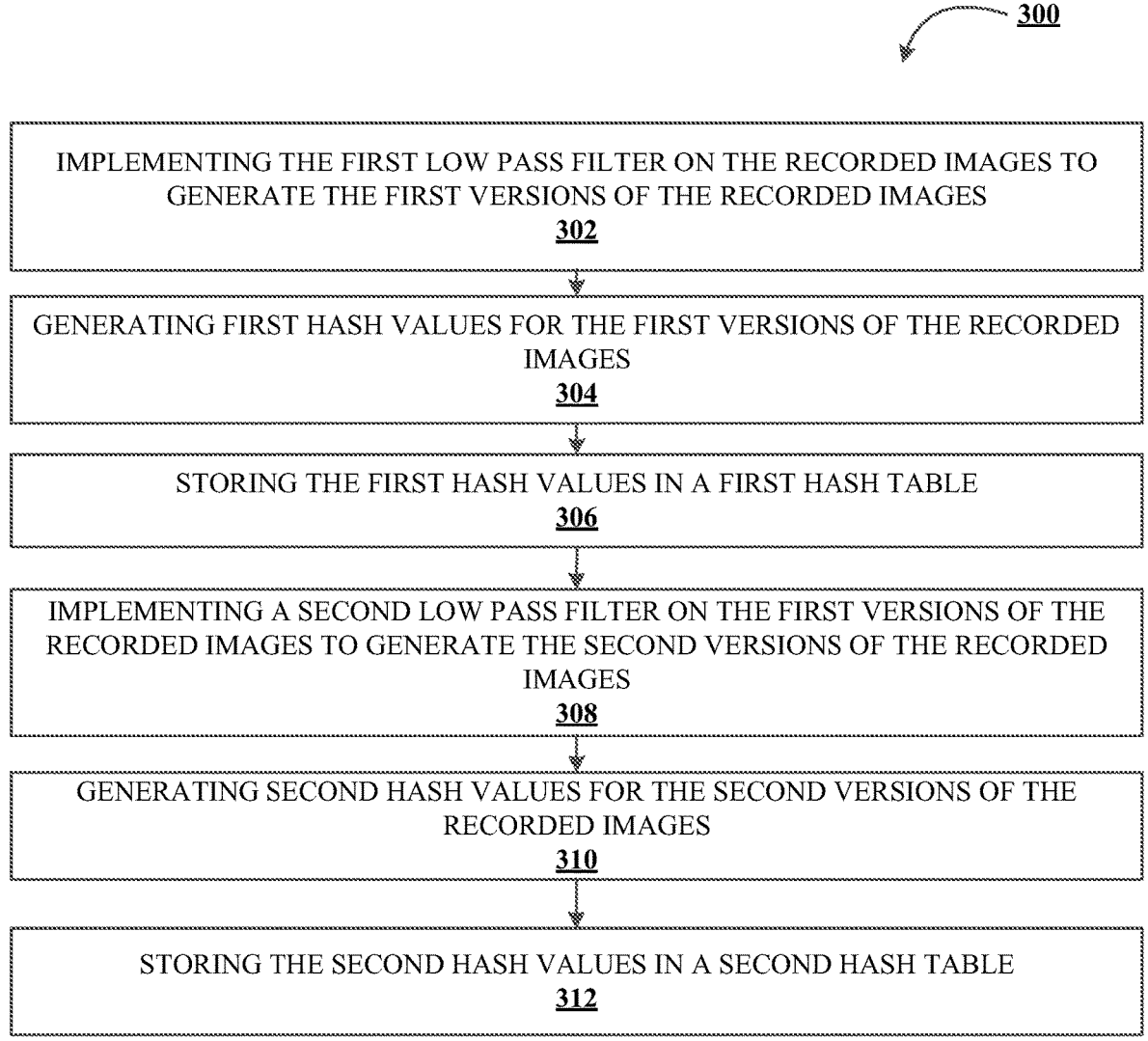
Figure 4:
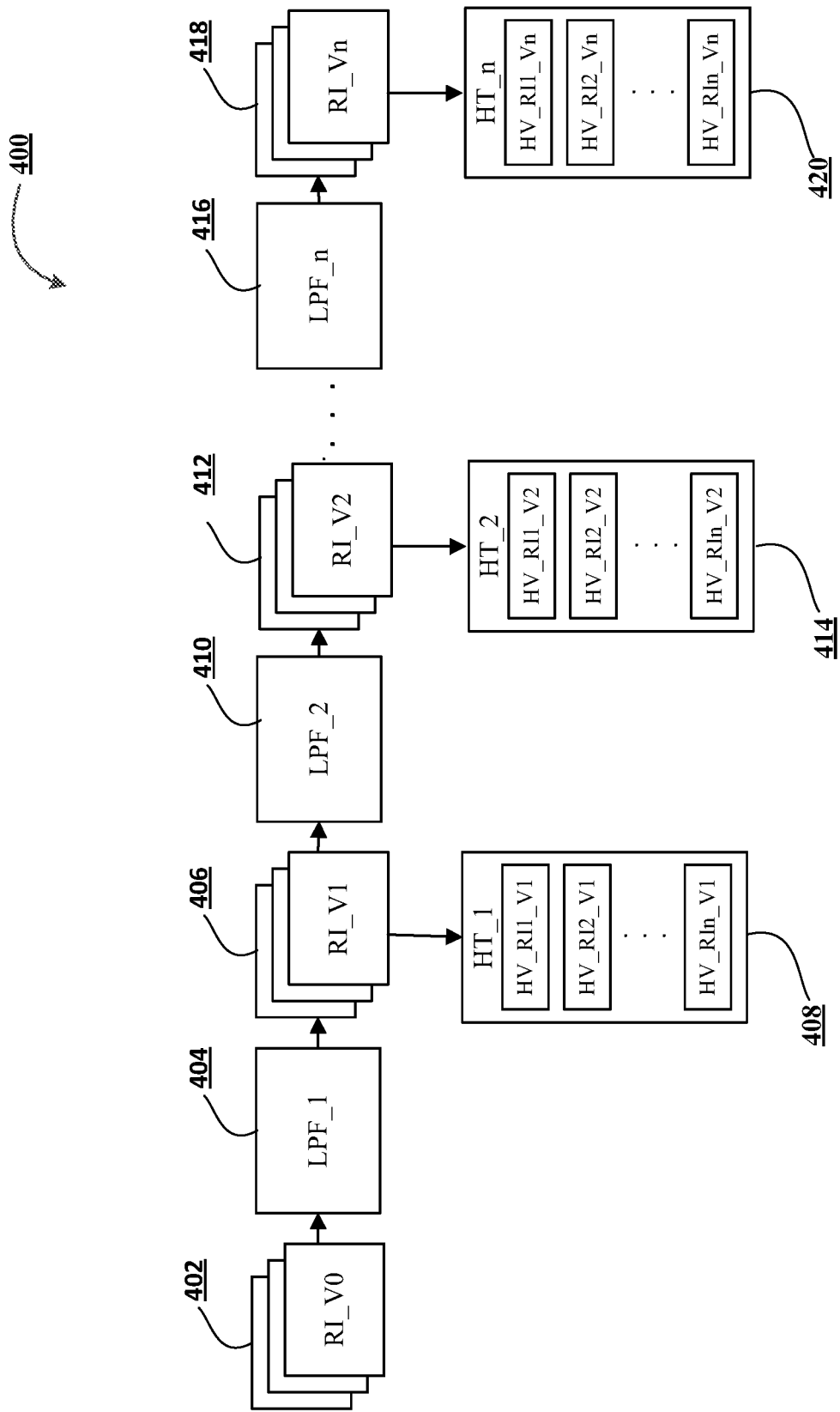
Figure 5:
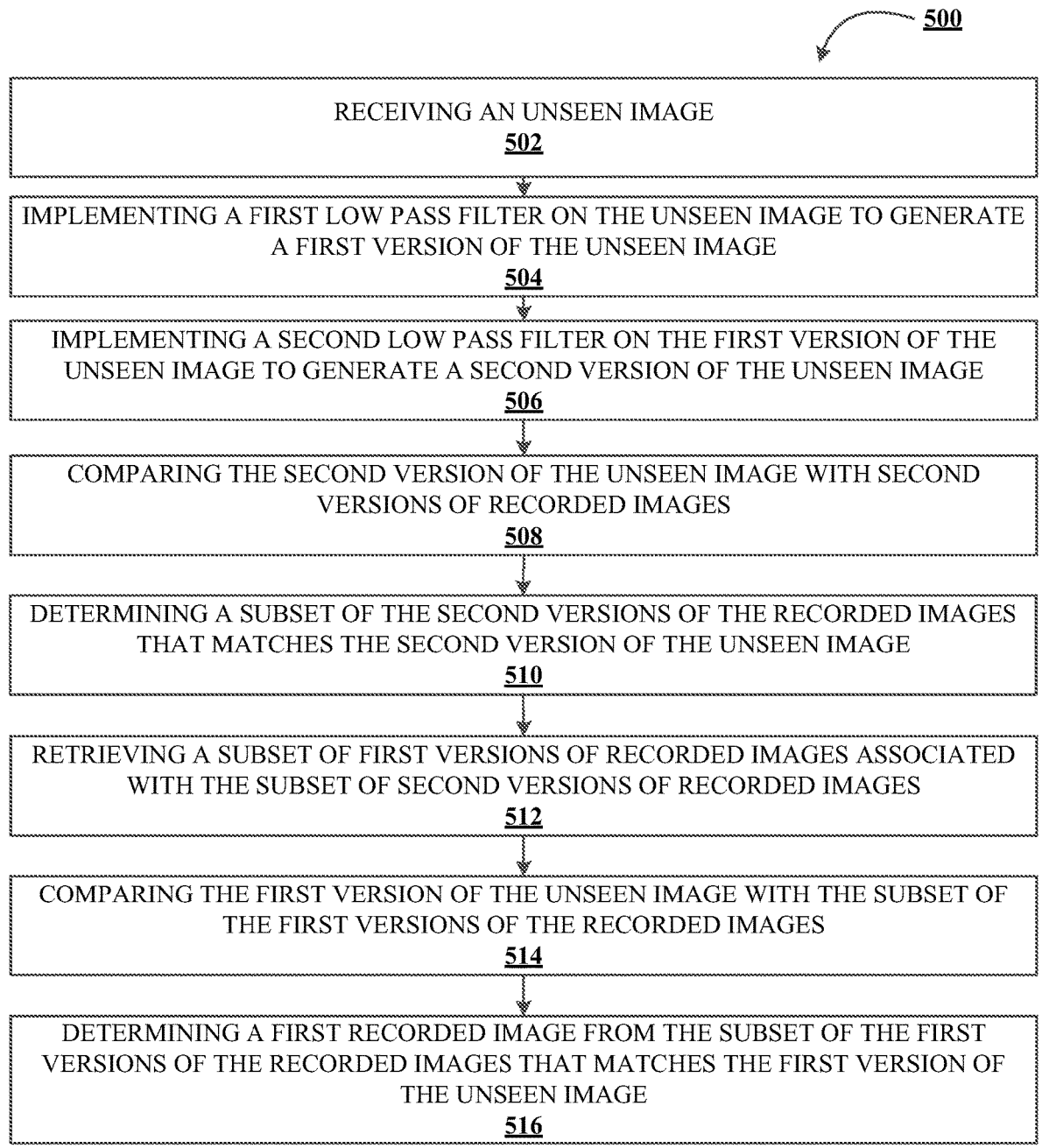
Figure 6:
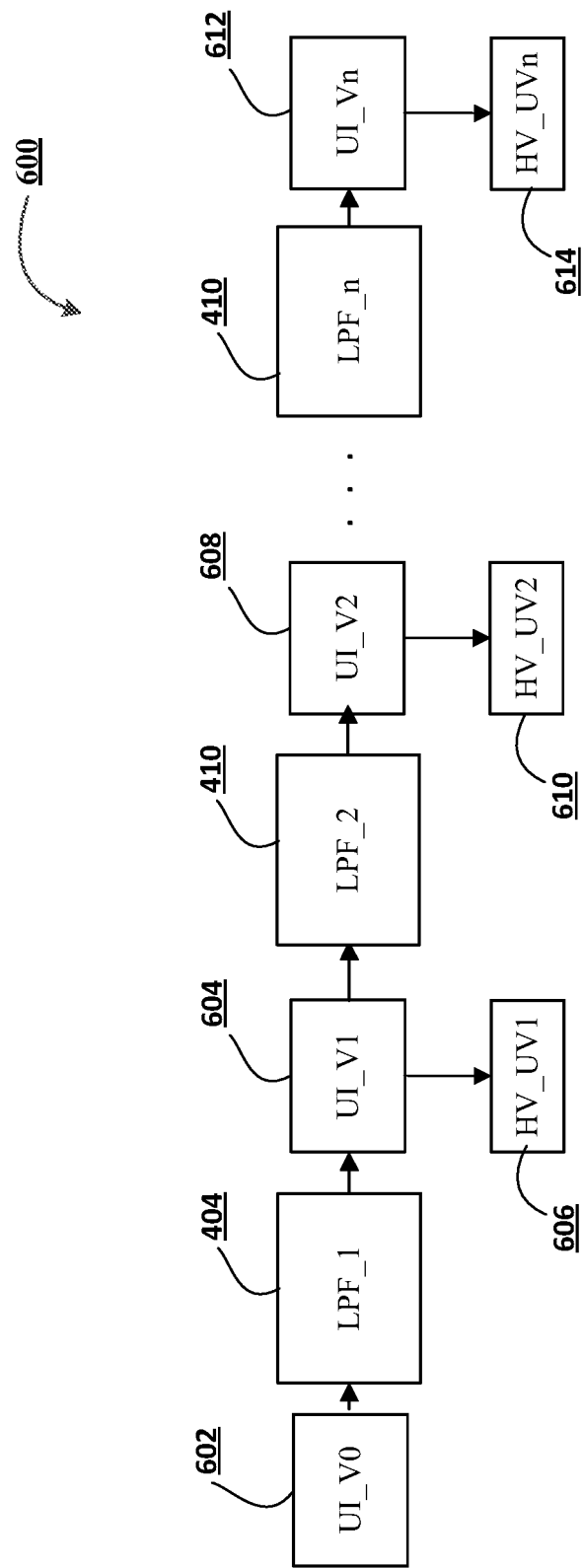
Figure 7:
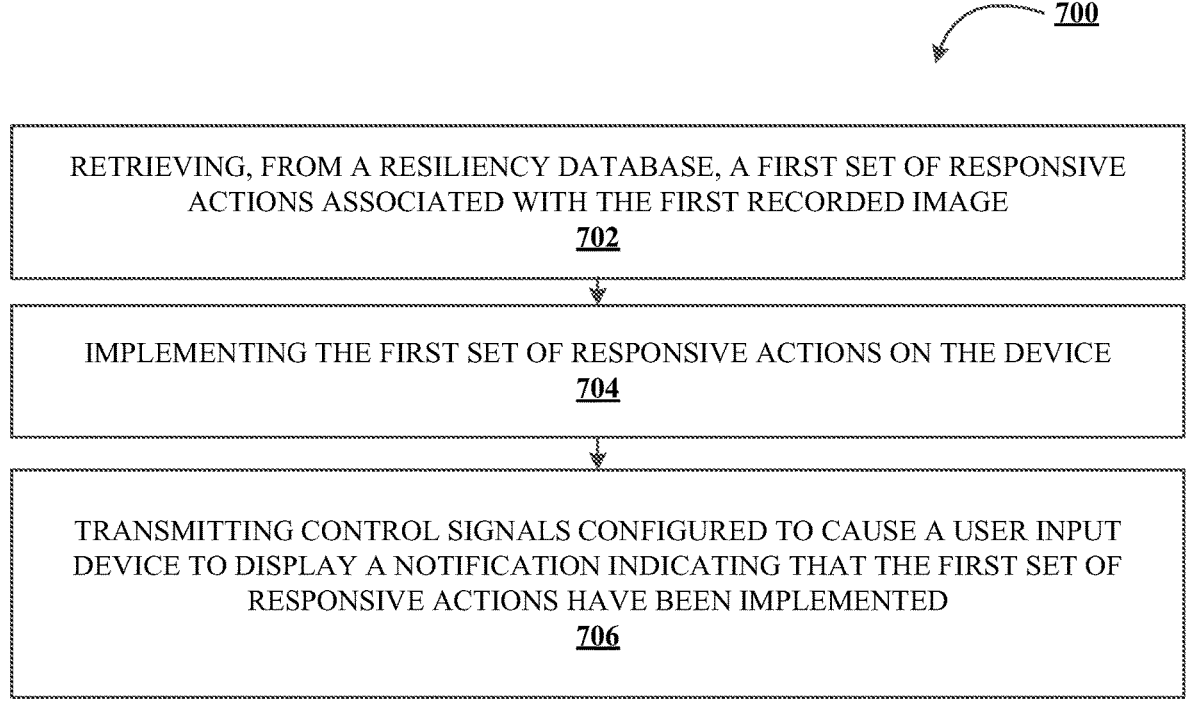

FIGS. 1A-1C illustrates technical components of an exemplary distributed computing environment for image categorization and recognition using unsupervised learning, in accordance with an embodiment of the disclosure;

FIG. 2 illustrates a method for receiving and subsequently storing recorded images with corresponding metadata, in accordance with an embodiment of the disclosure;

FIG. 3 illustrates a method for generating and subsequently storing hash values for each recorded image, in accordance with an embodiment of the disclosure;

FIG. 4 illustrates a data flow diagram for generating and subsequently storing hash values for each recorded image, in accordance with an embodiment of the disclosure;

FIG. 5 illustrates a method for categorization of an unseen image using the recorded images, in accordance with an embodiment of the disclosure;

FIG. 6 illustrates a data flow diagram for categorization of an unseen image using the recorded images, in accordance with an embodiment of the disclosure; and FIG. 7 illustrates a method for implementing responsive actions based on the categorization of the unseen image, in accordance with an embodiment of the disclosure.

DETAILED DESCRIPTION

Embodiments of the present disclosure will now be described more fully hereinafter with reference to the accompanying drawings, in which some, but not all, embodiments of the disclosure are shown. Indeed, the disclosure may be embodied in many different forms and should not be construed as limited to the embodiments set forth herein; rather, these embodiments are provided so that this disclosure will satisfy applicable legal requirements. Where possible, any terms expressed in the singular form herein are meant to also include the plural form and vice versa, unless explicitly stated otherwise. Also, as used herein, the term "a" and/or "an" shall mean "one or more," even though the phrase "one or more" is also used herein. Furthermore, when it is said herein that something is "based on" something else, it may be based on one or more other things as well. In other words, unless expressly indicated otherwise, as used herein "based on" means "based at least in part on" or "based at least partially on." Like numbers refer to like elements throughout.

As used herein, an "entity" may be any institution employing information technology resources and particularly technology infrastructure configured for processing large amounts of data. Typically, these data can be related to the people who work for the organization, its products or services, the customers or any other aspect of the operations of the organization. As such, the entity may be any institution, group, association, financial institution, establishment, company, union, authority or the like, employing information technology resources for processing large amounts of data.

As described herein, a "user" may be an individual associated with an entity. As such, in some embodiments, the user may be an individual having past relationships, current relationships or potential future relationships with an entity. In some embodiments, the user may be an employee (e.g., an associate, a project manager, an IT specialist, a manager, an administrator, an internal operations analyst, or the like) of the entity or enterprises affiliated with the entity.

As used herein, a "user interface" may be a point of human-computer interaction and communication in a device that allows a user to input information, such as commands or data, into a device, or that allows the device to output information to the user. For example, the user interface includes a graphical user interface (GUI) or an interface to input computer-executable instructions that direct a processor to carry out specific functions. The user interface typically employs certain input and output devices such as a display, mouse, keyboard, button, touchpad, touch screen, microphone, speaker, LED, light, joystick, switch, buzzer, bell, and/or other user input/output device for communicating with one or more users.

As used herein, an "engine" may refer to core elements of an application, or part of an application that serves as a foundation for a larger piece of software and drives the functionality of the software. In some embodiments, an engine may be self-contained, but externally-controllable code that encapsulates powerful logic designed to perform or execute a specific type of function. In one aspect, an engine may be underlying source code that establishes file hierarchy, input and output methods, and how a specific part of an application interacts or communicates with other software and/or hardware. The specific components of an engine may vary based on the needs of the specific application as part of the larger piece of software. In some embodiments, an engine may be configured to retrieve resources created in other applications, which may then be ported into the engine for use during specific operational aspects of the engine. An engine may be configurable to be implemented within any general purpose computing system. In doing so, the engine may be configured to execute source code embedded therein to control specific features of the general purpose computing system to execute specific computing operations, thereby transforming the general purpose system into a specific purpose computing system.

As used herein, "authentication credentials" may be any information that can be used to identify of a user. For example, a system may prompt a user to enter authentication information such as a username, a password, a personal identification number (PIN), a passcode, biometric information (e.g., iris recognition, retina scans, fingerprints, finger veins, palm veins, palm prints, digital bone anatomy/structure and positioning (distal phalanges, intermediate phalanges, proximal phalanges, and the like), an answer to a security question, a unique intrinsic user activity, such as making a predefined motion with a user device. This authentication information may be used to authenticate the identity of the user (e.g., determine that the authentication information is associated with the account) and determine that the user has authority to access an account or system. In some embodiments, the system may be owned or operated by an entity. In such embodiments, the entity may employ additional computer systems, such as authentication servers, to validate and certify resources inputted by the plurality of users within the system. The system may further use its authentication servers to certify the identity of users of the system, such that other users may verify the identity of the certified users. In some embodiments, the entity may certify the identity of the users. Furthermore, authentication information or permission may be assigned to or required from a user, application, computing node, computing cluster, or the like to access stored data within at least a portion of the system.

It should also be understood that "operatively coupled," as used herein, means that the components may be formed integrally with each other, or may be formed separately and coupled together. Furthermore, "operatively coupled" means that the components may be formed directly to each other, or to each other with one or more components located between the components that are operatively coupled together. Furthermore, "operatively coupled" may mean that the components are detachable from each other, or that they are permanently coupled together. Furthermore, operatively coupled components may mean that the components retain at least some freedom of movement in one or more directions or may be rotated about an axis (i.e., rotationally coupled, pivotally coupled). Furthermore, "operatively coupled" may mean that components may be electronically connected and/or in fluid communication with one another.

As used herein, an "interaction" may refer to any communication between one or more users, one or more entities or institutions, one or more devices, nodes, clusters, or systems within the distributed computing environment described herein. For example, an interaction may refer to a transfer of data between devices, an accessing of stored data by one or more nodes of a computing cluster, a transmission of a requested task, or the like.

It should be understood that the word "exemplary" is used herein to mean "serving as an example, instance, or illustration." Any implementation described herein as "exemplary" is not necessarily to be construed as advantageous over other implementations.

As used herein, "determining" may encompass a variety of actions. For example, "determining" may include calculating, computing, processing, deriving, investigating, ascertaining, and/or the like. Furthermore, "determining" may also include receiving (e.g., receiving information), accessing (e.g., accessing data in a memory), and/or the like. Also, "determining" may include resolving, selecting, choosing, calculating, establishing, and/or the like. Determining may also include ascertaining that a parameter matches a predetermined criterion, including that a threshold has been met, passed, exceeded, and so on.

Entities often implement telemetry based performance monitoring on each device to visualize, monitor, optimize, incident identification, and report on the health and availability of the device during operation. To this end, entities use measurable outputs capable of capturing performance of a device—such as device metrics, network flow data, packet data, and/or the like to determine a resiliency status for each device at each time instant. In some cases, entities employ data visualization techniques to graphically represent the performance parameters (both numerical and non-numerical parameters) and determine an operational status of the device to preemptively identify instances of device malfunction using the graphical representation.

Image categorization often involves images with distinct features and feature boundaries such as a human face, car, dog, ship, boat, flower, and/or the like. Image classification algorithms tend to focus on these features when categorizing, classifying and/or identifying these images. However, in cases of images with amorphous features (featureless), such as fire, snow, water, grassy fields, and/or the like, image classification algorithms often fail to capture features, requiring such images to be tagged in advance. However, tagging computer-generated imagery in advance may not always be possible. In cases where computer-generated imagery, such as heat map snapshots representing the performance telemetry of a device in a grid-like fashion, manual analysis of the resiliency status of the device that often changes every few seconds may result in mis-characterizations and mis-categorizations. Therefore, there is a need for an automated system for image categorization and recognition of computer-generated imagery images with amorphous features.

Embodiments of the present disclosure include an unsupervised solution for image categorization. Initially, each image (e.g., recorded image) is treated as a unique and previously unseen image and is categorized accordingly. Each image, for example, may be pictographic representation, such as a heat map, of a known resiliency status of a device. A device may often have a finite set of resiliency statuses associated therewith. For example, the resiliency statuses of a device may include operational, likely to malfunction, overloaded, operating at capacity, inoperational, and/or the like. During operation, it is not uncommon for a device to oscillate between multiple resiliency statuses when performing allocated operational functions. Over time, the images (e.g., heat maps) are categorized and stored based on their known resiliency statuses.

As part of the categorization process, each image is progressively processed using multiple low pass filters. For example, the original image is processed using a first low pass filter to generate a first version of the image. The first version of the image is then processed using a second low pass filter to generate a second version of the image, and so on. With each low pass filter, the resulting image begins to appear progressively blurry, as each pixel is affected by its neighbors, moving information around the image. Each image (e.g., version of the image), after being processed by a low pass filter is hashed to generate a corresponding hash value, which is then stored in a hash table for that version. As each image is progressively processed using multiple low pass filters, the grid of warm-to-colors tends to result in a blurry color gradient-like appearance. Thus, when images are processed using multiple low pass filters, it is not uncommon for two or more recorded images with distinct resiliency statuses to appear similar (or identical) to one another. What is more, these images may be identical enough to have the same hash values, so much so, that the hash table for the blurriest version of the images may have only a few distinct hash values.

When a previously unseen image is received, the goal of the system is to map the unseen image to a resiliency status based on the unseen image's similarity to a previously categorized image with known resiliency statuses (e.g., recorded images). Accordingly, the classification process proceeds in an unsupervised manner. The unseen image is processed in the same manner as the recorded images, for example, with the same number of low pass filters and identical low pass filters. After the unseen image is processed using the low pass filters, the resulting versions of the images are compared to the corresponding versions of the recorded images previously categorized. Accordingly, the comparison process begins by comparing the hash values of the blurriest version of the unseen image with the hash values of the blurriest version of the recorded images to identify potential matches. Then, for any identified matches, the system may retrieve the second blurriest version of the corresponding recorded images and compare the hash values of the second blurriest version of the corresponding recorded images to the second blurriest version of the unseen image, and so on. In doing so, the system may gradually narrow the number of identified matches between the unseen image and the recorded images until the hash values of the least blurry version of the unseen image (e.g., resulting unseen image after the first low pass filter) and the hash values of the least blurry version of the recorded images (e.g., resulting recorded images after the first low pass filter) are compared. At this point, a confidence level for each match is determined, and the unseen image is categorized to be same or similar to the recorded image corresponding to the match with the highest confidence level. Said differently, the current resiliency status of the device, as represented by the unseen image, is the same as the resiliency status of the recorded image with the highest confidence level match. The corresponding set of responsive actions for known resiliency status is then retrieved and implemented on the device.

What is more, the present disclosure provides a technical solution to a technical problem. With fewer steps to achieve the solution, the present disclosure reduces the amount of computing resources, such as processing resources, storage resources, network resources, and/or the like, that are being used. Furthermore, the present disclosure provides a more accurate solution to problem, thus reducing the number of resources required to remedy any errors made due to a less accurate solution. Lastly, by removing manual input and waste from the implementation of the solution, the present disclosure improves speed and efficiency of the process and conserving computing resources, thus reducing network traffic and load on existing computing resources. The technical solution described herein uses a rigorous, computerized process to perform specific tasks and/or activities that were not previously performed. In specific implementations, the technical solution bypasses a series of steps previously implemented, thus further conserving computing resources.

FIGS. 1A-1C illustrate technical components of an exemplary distributed computing environment for image categorization and recognition using unsupervised learning 100, in accordance with an embodiment of the disclosure. As shown in FIG. 1A, the distributed computing environment 100 contemplated herein may include a system 130, an end-point device(s) 140, and a network 110 over which the system 130 and end-point device(s) 140 communicate therebetween. FIG. 1A illustrates only one example of an embodiment of the distributed computing environment 100, and it will be appreciated that in other embodiments one or more of the systems, devices, and/or servers may be combined into a single system, device, or server, or be made up of multiple systems, devices, or servers. Also, the distributed computing environment 100 may include multiple systems, same or similar to system 130, with each system providing portions of the necessary operations (e.g., as a server bank, a group of blade servers, or a multi-processor system).

In some embodiments, the system 130 and the end-point device(s) 140 may have a client-server relationship in which the end-point device(s) 140 are remote devices that request and receive service from a centralized server, i.e., the system 130. In some other embodiments, the system 130 and the end-point device(s) 140 may have a peer-to-peer relationship in which the system 130 and the end-point device(s) 140 are considered equal and all have the same abilities to use the resources available on the network 110. Instead of having a central server (e.g., system 130) which would act as the shared drive, each device that is connect to the network 110 would act as the server for the files stored on it.

The system 130 may represent various forms of servers, such as web servers, database servers, file server, or the like, various forms of digital computing devices, such as laptops, desktops, video recorders, audio/video players, radios, workstations, or the like, or any other auxiliary network devices, such as wearable devices, Internet-of-things devices, electronic kiosk devices, mainframes, or the like, or any combination of the aforementioned.

The end-point device(s) 140 may represent various forms of electronic devices, including user input devices such as personal digital assistants, cellular telephones, smartphones, laptops, desktops, and/or the like, merchant input devices such as point-of-sale (POS) devices, electronic payment kiosks, and/or the like, electronic telecommunications device (e.g., automated teller machine (ATM)), and/or edge devices such as routers, routing switches, integrated access devices (IAD), and/or the like.

The network 110 may be a distributed network that is spread over different networks. This provides a single data communication network, which can be managed jointly or separately by each network. Besides shared communication within the network, the distributed network often also supports distributed processing. The network 110 may be a form of digital communication network such as a telecommunication network, a local area network ("LAN"), a wide area network ("WAN"), a global area network ("GAN"), the Internet, or any combination of the foregoing. The network 110 may be secure and/or unsecure and may also include wireless and/or wired and/or optical interconnection technology.

It is to be understood that the structure of the distributed computing environment and its components, connections and relationships, and their functions, are meant to be exemplary only, and are not meant to limit implementations of the disclosures described and/or claimed in this document. In one example, the distributed computing environment 100 may include more, fewer, or different components. In another example, some or all of the portions of the distributed computing environment 100 may be combined into a single portion or all of the portions of the system 130 may be separated into two or more distinct portions.

FIG. 1B illustrates an exemplary component-level structure of the system 130, in accordance with an embodiment of the disclosure. As shown in FIG. 1B, the system 130 may include a processor 102, memory 104, input/output (I/O) device 116, and a storage device 110. The system 130 may also include a high-speed interface 108 connecting to the memory 104, and a low-speed interface 112 connecting to low speed bus 114 and storage device 110. Each of the components 102, 104, 108, 110, and 112 may be operatively coupled to one another using various buses and may be mounted on a common motherboard or in other manners as appropriate. As described herein, the processor 102 may include a number of subsystems to execute the portions of processes described herein. Each subsystem may be a self-contained component of a larger system (e.g., system 130) and capable of being configured to execute specialized processes as part of the larger system.

The processor 102 can process instructions, such as instructions of an application that may perform the functions disclosed herein. These instructions may be stored in the memory 104 (e.g., non-transitory storage device) or on the storage device 110, for execution within the system 130 using any subsystems described herein. It is to be understood that the system 130 may use, as appropriate, multiple processors, along with multiple memories, and/or I/O devices, to execute the processes described herein.

The memory 104 stores information within the system 130. In one implementation, the memory 104 is a volatile memory unit or units, such as volatile random access memory (RAM) having a cache area for the temporary storage of information, such as a command, a current operating state of the distributed computing environment 100, an intended operating state of the distributed computing environment 100, instructions related to various methods and/or functionalities described herein, and/or the like. In another implementation, the memory 104 is a non-volatile memory unit or units. The memory 104 may also be another form of computer-readable medium, such as a magnetic or optical disk, which may be embedded and/or may be removable. The non-volatile memory may additionally or alternatively include an EEPROM, flash memory, and/or the like for storage of information such as instructions and/or data that may be read during execution of computer instructions. The memory 104 may store, recall, receive, transmit, and/or access various files and/or information used by the system 130 during operation.

The storage device 106 is capable of providing mass storage for the system 130. In one aspect, the storage device 106 may be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product may also contain instructions that, when executed, perform one or more methods, such as those described above. The information carrier may be a non-transitory computer- or machine-readable storage medium, such as the memory 104, the storage device 104, or memory on processor 102.

The high-speed interface 108 manages bandwidth-intensive operations for the system 130, while the low speed controller 112 manages lower bandwidth-intensive operations. Such allocation of functions is exemplary only. In some embodiments, the high-speed interface 108 is coupled to memory 104, input/output (I/O) device 116 (e.g., through a graphics processor or accelerator), and to high-speed expansion ports 111, which may accept various expansion cards (not shown). In such an implementation, low-speed controller 112 is coupled to storage device 106 and low-speed expansion port 114. The low-speed expansion port 114, which may include various communication ports (e.g., USB, Bluetooth, Ethernet, wireless Ethernet), may be coupled to one or more input/output devices, such as a keyboard, a pointing device, a scanner, or a networking device such as a switch or router, e.g., through a network adapter.

The system 130 may be implemented in a number of different forms. For example, the system 130 may be implemented as a standard server, or multiple times in a group of such servers. Additionally, the system 130 may also be implemented as part of a rack server system or a personal computer such as a laptop computer. Alternatively, components from system 130 may be combined with one or more other same or similar systems and an entire system 130 may be made up of multiple computing devices communicating with each other.

FIG. 1C illustrates an exemplary component-level structure of the end-point device(s) 140, in accordance with an embodiment of the disclosure. As shown in FIG. 1C, the end-point device(s) 140 includes a processor 152, memory 154, an input/output device such as a display 156, a communication interface 158, and a transceiver 160, among other components. The end-point device(s) 140 may also be provided with a storage device, such as a microdrive or other device, to provide additional storage. Each of the components 152, 154, 158, and 160, are interconnected using various buses, and several of the components may be mounted on a common motherboard or in other manners as appropriate.

The processor 152 is configured to execute instructions within the end-point device(s) 140, including instructions stored in the memory 154, which in one embodiment includes the instructions of an application that may perform the functions disclosed herein, including certain logic, data processing, and data storing functions. The processor may be implemented as a chipset of chips that include separate and multiple analog and digital processors. The processor may be configured to provide, for example, for coordination of the other components of the end-point device(s) 140, such as control of user interfaces, applications run by end-point device(s) 140, and wireless communication by end-point device(s) 140.

The processor 152 may be configured to communicate with the user through control interface 164 and display interface 166 coupled to a display 156. The display 156 may be, for example, a TFT LCD (Thin-Film-Transistor Liquid Crystal Display) or an OLED (Organic Light Emitting Diode) display, or other appropriate display technology. The display interface 156 may comprise appropriate circuitry and configured for driving the display 156 to present graphical and other information to a user. The control interface 164 may receive commands from a user and convert them for submission to the processor 152. In addition, an external interface 168 may be provided in communication with processor 152, so as to enable near area communication of end-point device(s) 140 with other devices. External interface 168 may provide, for example, for wired communication in some implementations, or for wireless communication in other implementations, and multiple interfaces may also be used.

The memory 154 stores information within the end-point device(s) 140. The memory 154 can be implemented as one or more of a computer-readable medium or media, a volatile memory unit or units, or a non-volatile memory unit or units. Expansion memory may also be provided and connected to end-point device(s) 140 through an expansion interface (not shown), which may include, for example, a SIMM (Single In Line Memory Module) card interface. Such expansion memory may provide extra storage space for end-point device(s) 140 or may also store applications or other information therein. In some embodiments, expansion memory may include instructions to carry out or supplement the processes described above and may include secure information also. For example, expansion memory may be provided as a security module for end-point device(s) 140 and may be programmed with instructions that permit secure use of end-point device(s) 140. In addition, secure applications may be provided via the SIMM cards, along with additional information, such as placing identifying information on the SIMM card in a non-hackable manner.

The memory 154 may include, for example, flash memory and/or NVRAM memory. In one aspect, a computer program product is tangibly embodied in an information carrier. The computer program product contains instructions that, when executed, perform one or more methods, such as those described herein. The information carrier is a computer- or machine-readable medium, such as the memory 154, expansion memory, memory on processor 152, or a propagated signal that may be received, for example, over transceiver 160 or external interface 168.

In some embodiments, the user may use the end-point device(s) 140 to transmit and/or receive information or commands to and from the system 130 via the network 110. Any communication between the system 130 and the end-point device(s) 140 may be subject to an authentication protocol allowing the system 130 to maintain security by permitting only authenticated users (or processes) to access the protected resources of the system 130, which may include servers, databases, applications, and/or any of the components described herein. To this end, the system 130 may trigger an authentication subsystem that may require the user (or process) to provide authentication credentials to determine whether the user (or process) is eligible to access the protected resources. Once the authentication credentials are validated and the user (or process) is authenticated, the authentication subsystem may provide the user (or process) with permissioned access to the protected resources. Similarly, the end-point device(s) 140 may provide the system 130 (or other client devices) permissioned access to the protected resources of the end-point device(s) 140, which may include a GPS device, an image capturing component (e.g., camera), a microphone, and/or a speaker.

The end-point device(s) 140 may communicate with the system 130 through communication interface 158, which may include digital signal processing circuitry where necessary. Communication interface 158 may provide for communications under various modes or protocols, such as the Internet Protocol (IP) suite (commonly known as TCP/IP). Protocols in the IP suite define end-to-end data handling methods for everything from packetizing, addressing and routing, to receiving. Broken down into layers, the IP suite includes the link layer, containing communication methods for data that remains within a single network segment (link); the Internet layer, providing internetworking between independent networks; the transport layer, handling host-to-host communication; and the application layer, providing process-to-process data exchange for applications. Each layer contains a stack of protocols used for communications. In addition, the communication interface 158 may provide for communications under various telecommunications standards (2G, 3G, 4G, 5G, and/or the like) using their respective layered protocol stacks. These communications may occur through a transceiver 160, such as radio-frequency transceiver. In addition, short-range communication may occur, such as using a Bluetooth, Wi-Fi, or other such transceiver (not shown). In addition, GPS (Global Positioning System) receiver module 170 may provide additional navigation—and location-related wireless data to end-point device(s) 140, which may be used as appropriate by applications running thereon, and in some embodiments, one or more applications operating on the system 130.

The end-point device(s) 140 may also communicate audibly using audio codec 162, which may receive spoken information from a user and convert the spoken information to usable digital information. Audio codec 162 may likewise generate audible sound for a user, such as through a speaker, e.g., in a handset of end-point device(s) 140. Such sound may include sound from voice telephone calls, may include recorded sound (e.g., voice messages, music files, etc.) and may also include sound generated by one or more applications operating on the end-point device(s) 140, and in some embodiments, one or more applications operating on the system 130.

Various implementations of the distributed computing environment 100, including the system 130 and end-point device(s) 140, and techniques described here can be realized in digital electronic circuitry, integrated circuitry, specially designed ASICs (application specific integrated circuits), computer hardware, firmware, software, and/or combinations thereof.

FIG. 2 illustrates a method for receiving and subsequently storing recorded images with corresponding metadata 200, in accordance with an embodiment of the disclosure. As shown in block 202, the method includes receiving recorded images, wherein the recorded images are associated with known resiliency statuses associated with a device. In some embodiments, a device may refer to any computing component (e.g., servers, switches, end-point devices, and/or the like), process, or application that may be part of the computing environment and/or involved in data movement within the computing environment.

In some embodiments, the resiliency status of the device may refer to an operational status of the device indicating its ability to perform allocated operational functions at a particular time instant. As described herein, entities may use data visualization techniques to pictographically represent the resiliency status of the device. To this end, the snapshots of images (e.g., recorded images) representing the performance telemetry of the device may be captured at periodic time intervals over a period of time. Each captured image may then be tagged with the appropriate resiliency status (e.g., known resiliency status) manually by a user (e.g., administrator who has knowledge of the functioning of the device).

Next, as shown in block 204, the method includes receiving, from a user input device, a set of responsive actions associated with each recorded image. In addition to tagging each recorded image with a known resiliency status, the user may also associate a set of responsive actions with each recorded image. In some embodiments, the responsive actions may refer to a specific action, project, activity, or process taken to reduce, address, or eliminate exposure, disruption, malfunction, or any systemic issue that may be caused due to the device having a particular resiliency status. For example, if the resiliency status of the device indicates that the device is likely to malfunction with an overwhelming confidence level (e.g., >90%), then the responsive action may include redirecting data traffic from the device to a redundant device that is same or similar to the malfunctioning device to mitigate drop in network connectivity.

Next, as shown in block 206, the method includes storing the recorded images, the known resiliency statuses associated with the device corresponding to the recorded images, and the set of responsive actions associated with each record image in the resiliency database.

FIG. 3 illustrates a method for generating and subsequently storing hash values for each recorded image 300, in accordance with an embodiment of the disclosure. As shown in block 302, the method includes implementing a first low pass filter on the recorded images to generate the first version of the recorded images. A low pass filter may be employed to remove high spatial frequency noise from a digital image. In some embodiments, low pass filters may employ a moving window operator which affects one pixel of the image at a time, changing its value by some function of a local region (window) of pixel. The window then moves over the image to affect all the pixels in the image. When implementing such a filter, each pixel may be affected by its neighbors, and the net effect of filtering is moving information around the image. To this end, the first low pass filter may be associated with a first cut-off frequency which results in the attenuation, i.e., removal of spatial components with frequencies higher than the first cut-off frequency, in the recorded image. As such, implementing a first low pass filter on a recorded image results in the removal of high spatial frequency components, causing a blurring effect on the recorded image. Here, the resulting blurred image of a recorded image is considered as the first version of the recorded image.

In some embodiments, prior to implementing the low pass filters on the recorded images, the system may implement a Fourier Transform (FT) to generate a frequency domain representation of the recorded images. Then, the system may implement the low pass filter on the frequency domain representation of the recorded images to generate the various versions of the recorded images (e.g., first version, second version, or the like). In the frequency domain, any convolution operation performed as part of the low pass filter becomes a matrix multiplication, which may be performed faster with fewer computation resources required.

Next, as shown in block 304, the method includes generating first hash values for the first version of the recorded images. Next, as shown in block 306, the method includes storing the first hash values in a first hash table. To generate hash values (e.g., first hash value), the system may employ image hashing techniques, whereby a hash function may be used to map each image to fixed-size values. Each image may be assigned a unique hash such that any duplicates of the image have the same hash value. Hash functions are robust against small changes in brightness, contrast, gamma corrections, compression, scaling, and/or resolution, and therefore ideal to detect (near-)identical images. As such, the system may implement image hashing techniques on the first version of the recorded images to generate a corresponding hash value for each image. In response to generating the first hash value, the system may store the first hash value as a record in the first hash table—a data structure that is used to store image-hash pairs for future retrieval.

Next, as shown in block 308, the method includes implementing a second low pass filter on the first version of the recorded images to generate the second version of the recorded images. In some embodiments, after implementing the first low pass filter on a recorded image to generate the first version of the recorded image, the system may then implement a second low pass filter on the first version of the recorded image to remove additional high spatial frequency components, increasing the blurring effect caused as a result. To this end, the second low pass filter may be associated with a second cut-off frequency which results in the attenuation, i.e., removal of spatial components with frequencies higher than the second cut-off frequency in the first version of the recorded image. As such, implementing a second low pass filter on the first version of the recorded image results in the removal of additional high spatial frequency components, causing further blurring effect on the first version of the recorded image. Here, the resulting blurred image of the first version of the recorded image is considered as the second version of the recorded image.

Next, as shown in block 310, the method includes generating second hash values for the second version of the recorded images. Next, as shown in block 312, the method includes storing the second hash values in a second hash table. In some embodiments, similar to the first hash values, the system may implement image hashing techniques on the second version of the recorded images to generate a corresponding hash value (e.g., second hash value) for each image. In response to generating the second hash value, the system may store the second hash value as a record in the second hash table—a data structure that is used to store image-hash pairs for future retrieval.

FIG. 4 illustrates a data flow diagram for generating and subsequently storing hash values for each recorded image 400, in accordance with an embodiment of the disclosure. As shown in FIG. 4, the original recorded images RI_V0 402 may be processed using a first low pass filter LPF_1 404 resulting in a first version of the recorded images RI_V1 406. As described herein, the first low pass filter LPF_1 404 may be associated with a first cut-off frequency. By implementing the first low pass filter LPF_1 404 on the original recorded images RI_V0 402, the system may remove spatial frequency components greater than the first cut-off frequency. This causes a blurring effect on the original recorded images RI_V0 402, resulting in the first version of the recorded images RI_V1 406. In response to generating the first version of the recorded images RI_V1 406, the system may implement image hashing techniques, whereby a hash function may be used to map each image to fixed-size values. By implementing image hashing techniques, the system may generate a first hash value for the first version of the each recorded image HV_RI1_V1, HV_RI2_V1, . . . , HV_RIn_V1. The resulting hash values are stored in a first hash table HV_1 408.

As shown in FIG. 4, the first version of the recorded images RI_V1 404 may be processed using a second low pass filter LPF_2 410 resulting in a second version of the recorded images RI_V2 412. As described herein, the second low pass filter LPF_2 410 may be associated with a second cut-off frequency. By implementing the second low pass filter LPF_2 410 on the first version of the recorded images RI_V1 406, the system may remove spatial frequency components greater than the second cut-off frequency, causing further blurring effect on the first version of the recorded images RI_V1 406. In response to generating the second version of the recorded images RI_V2 412, the system may implement image hashing techniques to generate a second hash value for the second version of each recorded image HV_RI1_V2, HV_RI2_V2, . . . , HV_R-In_V2. The resulting hash values are stored in a second hash table HV_2 414.

In this way, the original recorded images RI_V0 402 are progressively processed using n low pass filters LPF_n 416 to generate n versions of the recorded images. In response to generating the $n^{th}$ version of the recorded images RI_Vn 418, the system may implement image hashing techniques to generate an $n^{th}$ hash value for the $n^{th}$ version of each recorded image HV_RI1_Vn, HV_RI2_Vn, . . . , HV_R-In_Vn. The resulting hash values are stored in an $n^{th}$ hash table HV_n 420. In some embodiments, the number of low pass filters LPF_1 . . . LPF_n may depend on the type of data visualization technique used to pictographically represent the resiliency status of the device. In one aspect, the number of low pass filters LPF_1 . . . LPF_n may be selected by the user. In another aspect, the number of low pass filters LPF_1 . . . LPF_n may be automatically selected.

FIG. 5 illustrates a method for categorization of an unseen image using the recorded images, in accordance with an embodiment of the disclosure. As shown in block 502, the method includes receiving an unseen image. In some embodiments, the unseen image may be associated with a current resiliency status associated with a device. The unseen image is processed in the same way each recorded image has been previously processed to determine whether any of the recorded images matches the unseen image.

Next, as shown in block 504, the method includes implementing a first low pass filter on the unseen image to generate a first version of the unseen image. As described herein, the first low pass filter may be associated with a first cut-off frequency which results in the attenuation, i.e., removal of spatial components with frequencies higher than the first cut-off frequency in the unseen image. As such, implementing the first low pass filter on the unseen image results in the removal of high spatial frequency components, causing a blurring effect on the unseen image. Here, the resulting blurred image of an unseen image is considered as the first version of the unseen image. In some embodiments, in response to generating the first version of the unseen image, the system may generate a hash value (e.g., first hash value) for the first version of the unseen image to map the first version of the unseen image to a fixed-size value. In some embodiments, if the recorded images are processed in the frequency domain, the unseen image must also be represented in the frequency domain prior to implementing the low pass filters thereon.

Next, as shown in block 506, the method includes implementing a second low pass filter on the first version of the unseen image to generate a second version of the unseen image. Similarly, after implementing the first low pass filter on an unseen image to generate the first version of the unseen image, the system may then implement a second low pass filter on the first version of the unseen image to remove additional high spatial frequency components, increasing the blurring effect caused as a result. As described herein, the second low pass filter may be associated with a second cut-off frequency which results in the attenuation, i.e., removal of spatial components with frequencies higher than the second cut-off frequency in the first version of the unseen image. As such, implementing a second low pass filter on the first version of the unseen image results in the removal of additional high spatial frequency components, causing further blurring effect on the first version of the unseen image. Here, the resulting blurred image of the first version of the unseen image is considered as the second version of the unseen image. In some embodiments, in response to generating the second version of the unseen image, the system may generate a hash value (e.g., second hash value) for the second version of the unseen image to map the second version of the unseen image to a fixed-size value.

Next, as shown in block 508, the method includes comparing the second version of the unseen image with the second version of the recorded images. In some embodiments, in comparing the second version of the unseen image with the second version of the recorded images, the system may compare the second hash value for the second version of the unseen image with second hash values for second version of recorded images. In response, the system may determine a subset of the second hash values for the second version of the recorded images that match the second hash value for the second version of the unseen image.

Next, as shown in block 510, the method includes determining a subset of the second version of the recorded images that matches the second version of the unseen image. Even though each recorded image may be unique, when the images are progressively processed using multiple low pass filters, the resulting blurred images (e.g., second version of the images) may begin to resemble one another. For example, assume that the recorded images represent multiple performance parameters in a grid-like fashion in warm-to-cool colors, i.e., a heat map. When such a recorded image is progressively processed using multiple low pass filters, the grid of warm-to-colors often results in a blurry color gradient-like appearance. Thus, when recorded images are processed using multiple low pass filters, it is not uncommon for two or more recorded images with distinct known resiliency statuses to appear similar (or identical) to one another. What is more, these recorded images may be identical enough to have the same hash values. So, when an unseen image (also a heat map) is processed similarly, the resulting image also results in a blurry color gradient-like appearance. When the second hash value for the second version of the unseen image is compared to the second hash values of the second version of the recorded images, there may inevitably be multiple matches (e.g., subset of the second hash values for the second version of the recorded images).

Next, as shown in block 512, the method includes retrieving a subset of the first version of the recorded images associated with the subset of the second version of the recorded images. In some embodiments, in response to determining a match between the second version of the unseen image and the subset of the second version of the recorded images, the system may identify a subset of the first version of the recorded images that correspond to the subset of the second version of the recorded images that match the second version of the unseen image. In addition to identifying the subset of the first version of the recorded images, the system may retrieve, from a first hash table, hash values associated with the subset of the first version of the recorded images.

Next, as shown in block 514, the method includes comparing the first version of the unseen image with the subset of the first version of the recorded images. In this regard, the system may compare the first hash value for the first version of the unseen image with subset of the first hash values for first version of recorded images. As described herein, as each image (e.g., recorded image or unseen image) is progressively processed using multiple low pass filters, the grid of warm-to-cool colors often results in a blurry color gradient-like appearance. More specifically, when an image is processed using a first low pass filter, each pixel may be affected by its neighbors, causing the grid of warm-to-cool colors to see blurring around the sharp edges of the grid boundaries. When the resulting blurry image is processed using a second low pass filter, each pixel in the already blurry image may be further affected by its neighbors, causing additional blurring around the sharp edges of the grid boundaries. As more low pass filters are used, the blurriness of the image becomes more and more apparent, resulting in an image with blurry color gradient-like appearance.

When comparing the unseen image with recorded images, the system may first begin the comparison process by comparing the blurriest version of the unseen image (e.g., second version of the unseen image) with the blurriest version of the recorded images (e.g., second version of the recorded images) to identify potential matches. Then, for any identified matches, the system may retrieve the second blurriest version of the corresponding recorded images (e.g., subset of the first version of the recorded images) and compare them to the second blurriest version of the unseen image (e.g., first version of the unseen image), and so on. In doing so, the system may gradually narrow the number of identified matches between the unseen image and the recorded images.

Next, as shown in block 516, the method includes determining a first recorded image from the subset of the first version of the recorded images that matches the first version of the unseen image. In some embodiments, the system may determine at least one first hash value associated with the at least one first version of the recorded image that matches the first hash value of the first version of the unseen image. In one aspect, the system may determine a confidence level associated with the matching of the at least one first version of the recorded image and the first version of the unseen image. The confidence level for each matching may be compared to a selection threshold. If the confidence level associated with a matching meets a selection threshold, the system may determine that the unseen image matches the corresponding recorded image (e.g., first recorded image), indicating that the current resiliency status of the device as indicated in the unseen image matches a known resiliency status (e.g., first known resiliency status) associated with the first recorded image.

FIG. 6 illustrates a data flow diagram for categorization of an unseen image using the recorded images, in accordance with an embodiment of the disclosure. As shown in FIG. 6, the original unseen image UI_V0 602 may be processed using the first low pass filter LPF_1 404 resulting in a first version of the unseen image UI_V1 604. By implementing the first low pass filter LPF_1 404 on the original unseen image UI_V0 602, the system may remove spatial frequency components greater than the first cut-off frequency. This causes a blurring effect on the original unseen image UI_V0 602, resulting in the first version of the unseen image UI_V1 604. In response to generating the first version of the unseen image UI_V1 604, the system may implement image hashing techniques, whereby a hash function may be used to map the image to fixed-size values. By implementing image hashing techniques, the system may generate a first hash value HV_UV1 606 for the first version of the unseen image UI_V1 604.

As shown in FIG. 6, the first version of the unseen image UI_V1 604 may be processed using a second low pass filter LPF_2 410 resulting in a second version of the unseen image UI_V2 608. As described herein, the second low pass filter LPF_2 410 may be associated with a second cut-off frequency. By implementing the second low pass filter LPF_2 410 on the first version of the unseen image UI_V1 604, the system may remove spatial frequency components greater than the second cut-off frequency, causing further blurring effect on the first version of the unseen image UI_V1 604. In response to generating the second version of the unseen image UI_V2 608, the system may implement image hashing techniques to generate a second hash value HV_UV2 610 for the second version of the unseen image UI_V2 608.

In this way, similar to the recorded images, the original unseen images UI_V0 602 is progressively processed using n low pass filters LPF_n 416 to generate n versions of the unseen image. In response to generating the $n^{th}$ version of the unseen UI_Vn 612, the system may implement image hashing techniques to generate an $n^{th}$ hash value HV_UVn 614 for each $n^{th}$ version of the recorded image UI_Vn 612.

FIG. 7 illustrates a method for implementing responsive actions based on the categorization of the unseen image, in accordance with an embodiment of the disclosure. As shown in block 702, the method includes retrieving from a resiliency database, a first set of responsive actions associated with the first recorded image. In some embodiments, the set of responsive actions and known resiliency status associated with each recorded image may be stored in a resiliency database and tagged accordingly. As described herein, each recorded image may be associated with a known resiliency status and set of responsive actions—a specific action, project, activity, or process taken to reduce, address, or eliminate exposure, disruption, malfunction, or any systemic issue that may be caused due to the device having the known resiliency status.

Next, as shown in block 704, the method includes implementing the first set of responsive actions on the device. In some embodiments, the first set of responsive actions may be implemented automatically in response to determining a match between the unseen image and the first recorded image. In some other embodiments, the system may be configured to require a user input authorizing the implementation of the first set of responsive actions.

Next, as shown in block 706, the method includes transmitting control signals configured to cause a user input device to display a notification indicating that the first set of responsive actions have been implemented. In embodiments where a user input is required, the system may be configured to transmit control signals configured to cause the user input device to display a notification that may indicate, (i) the unseen image matches the first recorded image, (ii) the first recorded image is associated with a first known resiliency status, and/or (iii) the first known resiliency status is associated with a first set of responsive actions. In addition, the notification may include an option for the user to authorize the implementation of the first set of responsive actions. The user, in response, may select the option to authorize the implementation of the first set of responsive action. Such a selection may trigger the system to implement the first set of responsive actions.

As will be appreciated by one of ordinary skill in the art, the present disclosure may be embodied as an apparatus (including, for example, a system, a machine, a device, a computer program product, and/or the like), as a method (including, for example, a business process, a computer-implemented process, and/or the like), as a computer program product (including firmware, resident software, microcode, and the like), or as any combination of the foregoing. Many modifications and other embodiments of the present disclosure set forth herein will come to mind to one skilled in the art to which these embodiments pertain having the benefit of the teachings presented in the foregoing descriptions and the associated drawings. Although the figures only show certain components of the methods and systems described herein, it is understood that various other components may also be part of the disclosures herein. In addition, the method described above may include fewer steps in some cases, while in other cases may include additional steps. Modifications to the steps of the method described above, in some cases, may be performed in any order and in any combination.

Therefore, it is to be understood that the present disclosure is not to be limited to the specific embodiments disclosed and that modifications and other embodiments are intended to be included within the scope of the appended claims. Although specific terms are employed herein, they are used in a generic and descriptive sense only and not for purposes of limitation.

What is claimed is:

1. A system for image categorization and recognition using unsupervised learning, the system comprising:
    a non-transitory storage device; and
    a processor coupled to the non-transitory storage device, wherein the processor is configured to:
        receive an unseen image, wherein the unseen image is associated with a current resiliency status associated with a device;
        implement a first low pass filter on the unseen image to generate a first version of the unseen image;
        implement a second low pass filter on the first version of the unseen image to generate a second version of the unseen image;
        compare the second version of the unseen image with second version of recorded images;
        determine a subset of the second version of the recorded images that matches the second version of the unseen image;
        retrieve a subset of first version of recorded images associated with the subset of second version of recorded images;
        compare the first version of the unseen image with the subset of the first version of the recorded images;
        determine at least one first version of the recorded image from the subset of the first version of the recorded images that matches the first version of the unseen image;
        retrieve a first recorded image associated with the at least one first version of the recorded image;
        retrieve, from a resiliency database, a first set of responsive actions associated with the first recorded image; and
        implement the first set of responsive actions on the device.

2. The system of claim 1, wherein the processor is further configured to:
    receive the recorded images;
    implement the first low pass filter on the recorded images to generate the first version of the recorded images;
    generate first hash values for the first version of the recorded images; and
    store the first hash values in a first hash table.

3. The system of claim 2, wherein the processor is further configured to:
    implement the second low pass filter on the first version of the recorded images to generate the second version of the recorded images;
    generate second hash values for the second version of the recorded images; and
    store the second hash values in a second hash table.

4. The system of claim 3, wherein, in comparing the first version of the unseen image with the subset of the first version of the recorded images, the processor is further configured to:
    generate a first hash value for the first version of the unseen image;
    retrieve, from the first hash table, a subset of first hash values associated with the subset of first version of recorded images; and
    compare the first hash value for the first version of the unseen image with the subset of the first hash values associated with the subset of first version of recorded images.

5. The system of claim 4, wherein, in comparing the second version of the unseen image with second version of recorded images, the processor is further configured to:
    generate a second hash value for the second version of the unseen image;
    compare the second hash value for the second version of the unseen image with second hash values for second version of recorded images; and
    determine a subset of the second hash values that match the second hash value for the second version of the unseen image.

6. The system of claim 4, wherein, in determining the at least one first version of the recorded image from the subset of the first version of the recorded images that matches the first version of the unseen image, the processor is further configured to:
    determine at least one first hash value associated with the at least one first version of the recorded image.

7. The system of claim 1, wherein, in retrieving the first recorded image, the processor is further configured to:
    determine a confidence level associated with the matching of the at least one first version of the recorded image and the first version of the unseen image;
    determine that the confidence level associated with the matching of a first version of the first recorded image meets a selection threshold, wherein the first version of the first recorded image is associated with the at least one first version of the recorded image; and
    in response, determine that the current resiliency status of the device as indicated in the unseen image matches a first known resiliency status associated with the first recorded image.

8. The system of claim 1, wherein the processor is further configured to:
    receive the recorded images, wherein the recorded images are associated with known resiliency statuses associated with the device;

receive, from a user input device, a set of responsive
actions associated with each recorded image; and
store the recorded images, the known resiliency statuses
associated with the device corresponding to the
recorded images, and the set of responsive actions
associated with each record image in the resiliency
database.

9. The system of claim 1, wherein, in implementing a first low pass filter on the unseen image, the processor is further configured to:
implement a Fourier Transform (FT) on the unseen image to generate a frequency domain representation of the unseen image; and
implement the first low pass filter on the frequency domain representation of the unseen image to generate the first version of the unseen image.

10. A computer program product for image categorization and recognition using unsupervised learning, the computer program product comprising a non-transitory computer-readable medium comprising code causing an apparatus to:
receive an unseen image, wherein the unseen image is associated with a current resiliency status associated with a device;
implement a first low pass filter on the unseen image to generate a first version of the unseen image;
implement a second low pass filter on the first version of the unseen image to generate a second version of the unseen image;
compare the second version of the unseen image with second version of recorded images;
determine a subset of the second version of the recorded images that matches the second version of the unseen image;
retrieve a subset of first version of recorded images associated with the subset of second version of recorded images;
compare the first version of the unseen image with the subset of the first version of the recorded images;
determine at least one first version of the recorded image from the subset of the first version of the recorded images that matches the first version of the unseen image;
retrieve a first recorded image associated with the at least one first version of the recorded image;
retrieve, from a resiliency database, a first set of responsive actions associated with the first recorded image; and
implement the first set of responsive actions on the device.

11. The computer program product of claim 10, wherein the apparatus is further configured to:
receive the recorded images;
implement the first low pass filter on the recorded images to generate the first version of the recorded images;
generate first hash values for the first version of the recorded images; and
store the first hash values in a first hash table.

12. The computer program product of claim 11, wherein the apparatus is further configured to:
implement the second low pass filter on the first version of the recorded images to generate the second version of the recorded images;
generate second hash values for the second version of the recorded images; and
store the second hash values in a second hash table.

13. The computer program product of claim 12, wherein, in comparing the first version of the unseen image with the subset of the first version of the recorded images, the apparatus is further configured to:
generate a first hash value for the first version of the unseen image;
retrieve, from the first hash table, a subset of first hash values associated with the subset of first version of recorded images; and
compare the first hash value for the first version of the unseen image with the subset of the first hash values associated with the subset of first version of recorded images.

14. The computer program product of claim 13, wherein, in comparing the second version of the unseen image with second version of recorded images, the apparatus is further configured to:
generate a second hash value for the second version of the unseen image;
compare the second hash value for the second version of the unseen image with second hash values for second version of recorded images; and
determine a subset of the second hash values that match the second hash value for the second version of the unseen image.

15. The computer program product of claim 13, wherein, in determining the at least one first version of the recorded image from the subset of the first version of the recorded images that matches the first version of the unseen image, the apparatus is further configured to:
determine at least one first hash value associated with the at least one first version of the recorded image.

16. The computer program product of claim 10, wherein, in retrieving the first recorded image, the apparatus is further configured to:
determine a confidence level associated with the matching of the at least one first version of the recorded image and the first version of the unseen image;
determine that the confidence level associated with the matching of a first version of the first recorded image meets a selection threshold, wherein the first version of the first recorded image is associated with the at least one first version of the recorded image; and
in response, determine that the current resiliency status of the device as indicated in the unseen image matches a first known resiliency status associated with the first recorded image.

17. The computer program product of claim 10, wherein the apparatus is further configured to:
receive the recorded images, wherein the recorded images are associated with known resiliency statuses associated with the device;
receive, from a user input device, a set of responsive actions associated with each recorded image; and
store the recorded images, the known resiliency statuses associated with the device corresponding to the recorded images, and the set of responsive actions associated with each record image in the resiliency database.

18. The computer program product of claim 10, wherein, in implementing a first low pass filter on the unseen image, the apparatus is further configured to:
implement a Fourier Transform (FT) on the unseen image to generate a frequency domain representation of the unseen image; and
implement the first low pass filter on the frequency domain representation of the unseen image to generate the first version of the unseen image.

19. A method for image categorization and recognition using unsupervised learning, the method comprising:
- receiving an unseen image, wherein the unseen image is associated with a current resiliency status associated with a device;
- implementing a first low pass filter on the unseen image to generate a first version of the unseen image;
- implementing a second low pass filter on the first version of the unseen image to generate a second version of the unseen image;
- comparing the second version of the unseen image with second version of recorded images;
- determining a subset of the second version of the recorded images that matches the second version of the unseen image;
- retrieving a subset of first version of recorded images associated with the subset of second version of recorded images;
- comparing the first version of the unseen image with the subset of the first version of the recorded images;
- determining at least one first version of the recorded image from the subset of the first version of the recorded images that matches the first version of the unseen image;
- retrieving a first recorded image associated with the at least one first version of the recorded image;
- retrieving, from a resiliency database, a first set of responsive actions associated with the first recorded image; and
- implementing the first set of responsive actions on the device.

20. The method of claim 19, wherein the method further comprises:
- receiving the recorded images;
- implementing the first low pass filter on the recorded images to generate the first version of the recorded images;
- generating first hash values for the first version of the recorded images; and
- storing the first hash values in a first hash table.

* * * * *